UNITED STATES PATENT OFFICE.

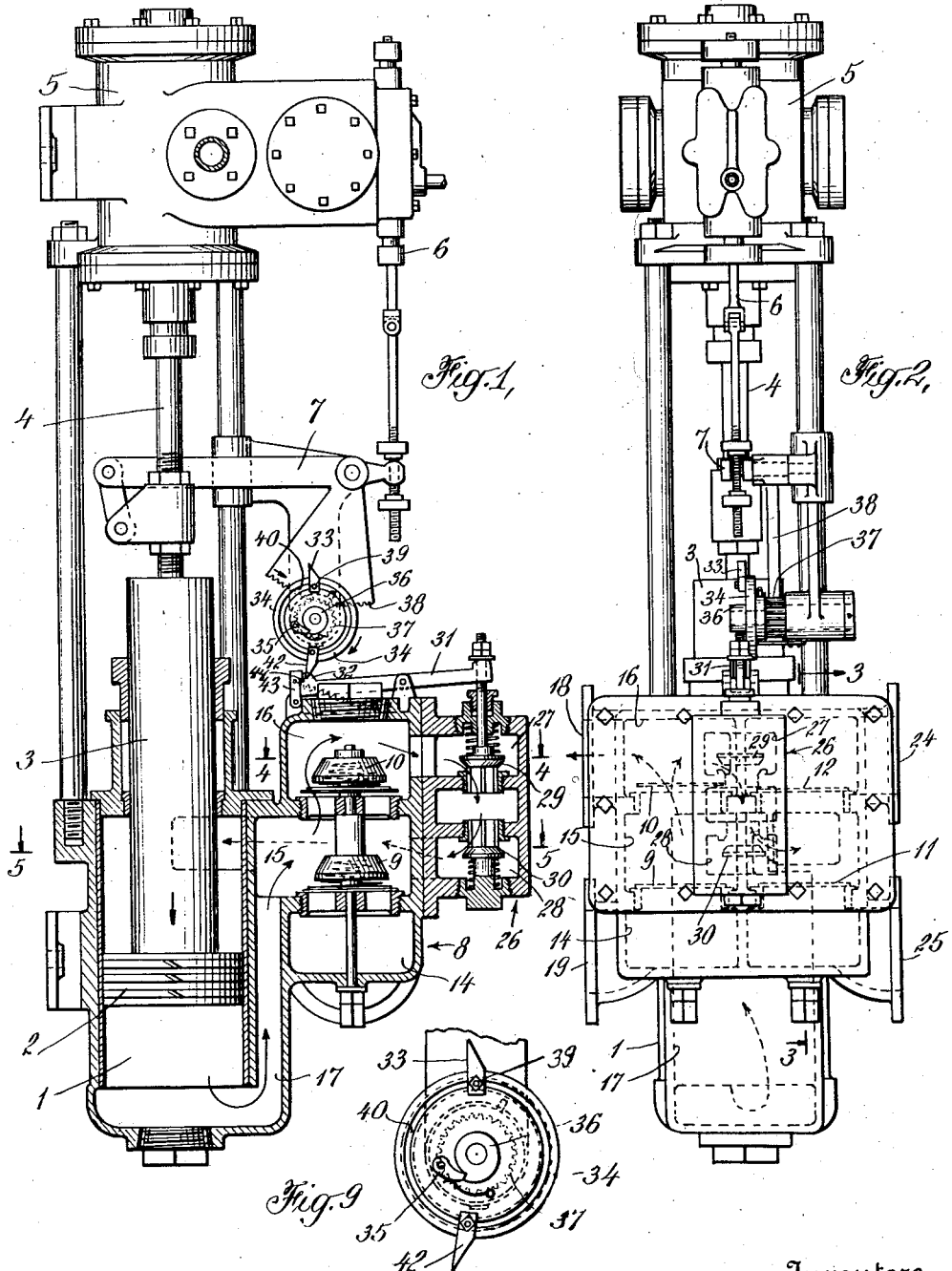

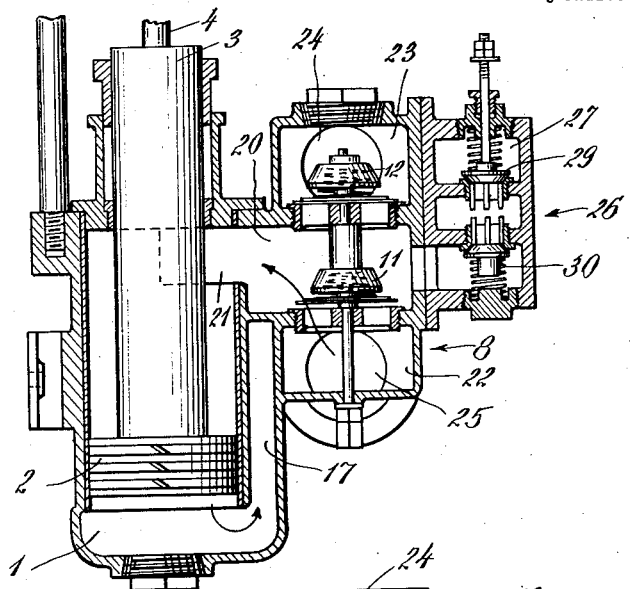
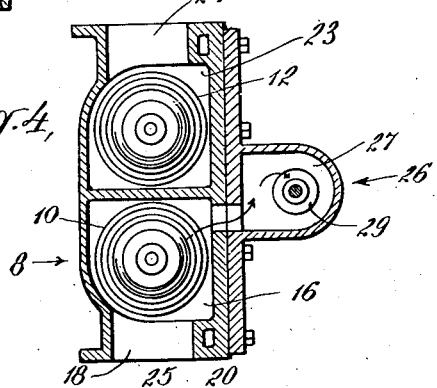
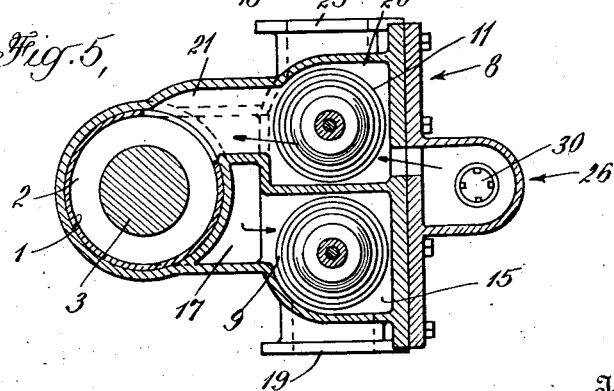

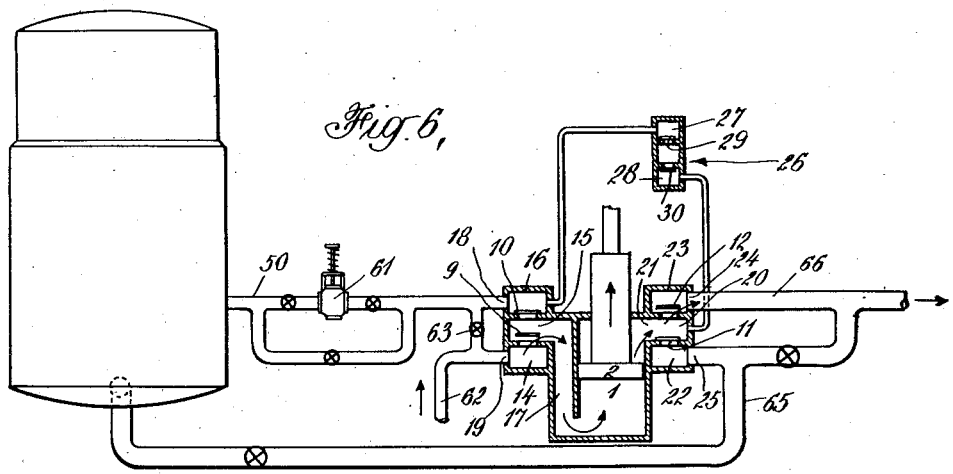
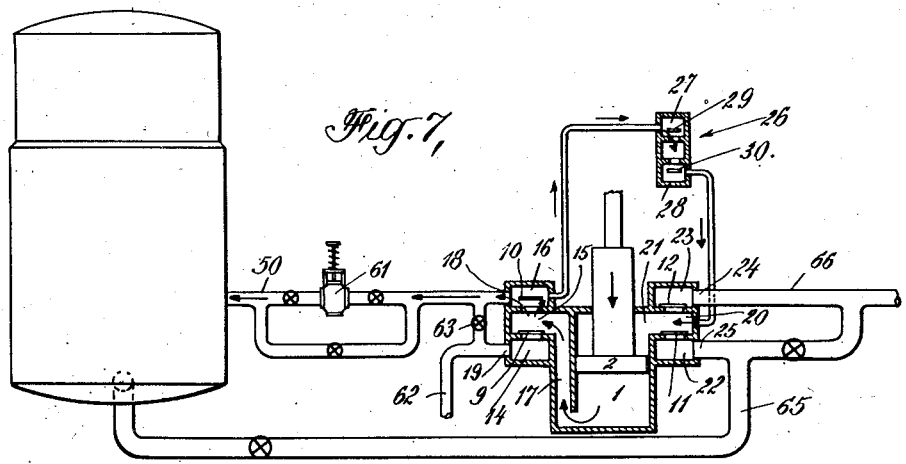
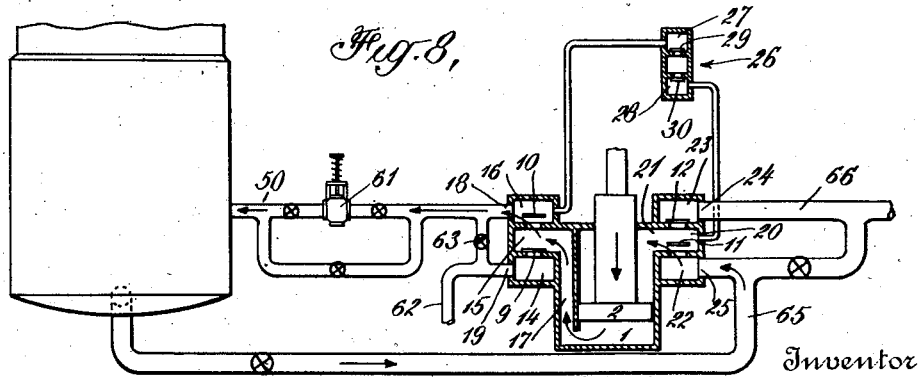

ERIC HUGO NELSON AND EDWARD A. DEWALD, OF MASSILLON, OHIO, ASSIGNORS TO THE GRISCOM RUSSELL COMPANY, OF NEW YORK, N. Y., A CORPORATION OF DELAWARE.

COMBINED FEED AND BRINE PUMP.

1,405,737.          Specification of Letters Patent.         Patented Feb. 7, 1922.

Application filed July 30, 1920. Serial No. 400,270.

*To all whom it may concern:*

Be it known that we, ERIC HUGO NELSON and EDWARD A. DEWALD, both citizens of the United States, residing at Massillon, Stark County, State of Ohio, have invented certain new and useful Improvements in Combined Feed and Brine Pumps; and we do hereby declare the following to be a full, clear, and exact description of the invention, such as will enable others skilled in the art to which it appertains to make and use the same.

This invention relates to a combined feed and brine pump for evaporators, and has for its object to provide a single pumping mechanism operating to simultaneously pump definite quantities of the raw water or other solution to be evaporated into the evaporators and draw out from the evaporator shell definite quantities of the concentrated brine or solution so that the quantity of vapor generated will be fixed by the relative quantities of feed pumped into the evaporator and the concentrated solution withdrawn.

A further object of the invention is to provide a pump of this class in which the relative capacities of the feed and "blow-down" output from the pump may be varied to thereby vary the degree of concentration of the solution, that is, to vary the vapor output per unit quantity of raw liquid taken into the evaporators, which, for the purpose of this application will be assumed to be sea water.

A further object of the invention is to provide a connection between the feed and discharge portions of the pump whereby a portion of the cold water drawn from the sea is injected into the discharge line from the evaporators to reduce the temperature of the discharged concentrated solution for the purpose of preventing the so-called "flash" or instantaneous production of steam from the hot concentrated solution on its discharge into a lower pressure than prevailing in the evaporator. This feature of the invention is of particular advantage in high heat level systems where the discharge from the evaporators is at a high temperature even after utilizing such heat as can be economically absorbed in the feed water heaters for the evaporators.

A further object of the invention is to provide an apparatus of this kind consisting of a compact structure of simple design which may be directly driven from an ordinary reciprocating engine or other source of power, which is of low manufacturing cost and which will stand continued operation and hard usage.

To this end the preferred embodiment of the invention which we have selected for illustration consists essentially of a reciprocating double-acting pump having its piston directly connected to the piston rod of the steam engine and provided with two independent sets of valves so that the two ends of the cylinder act as separate pumps. The outer end of the cylinder is connected with the feed line of the evaporators while the inner end of the cylinder, that is, the side containing the piston rod, is connected to the discharge pipe so that on each stroke of the piston the full capacity of the cylinder will be drawn into the feed side of the cylinder and discharged therefrom while the quantity of liquid drawn into and discharged from the other end of the cylinder will be less than the full capacity thereof by a volume equal to the space occupied by the piston rod of the pump. The piston rod is of large diameter, so that the capacity of the discharge side of the pump will be materially less than the feed, so that if no by-pass were provided the discharge would be a fixed fraction of the feed and the quantity of vapor would equal the difference between the feed and discharge.

We prefer, however, to employ with the pump a by-pass valve mechanism positively operated from a moving part of the pump to by-pass or short-circuit the two sides of the pump for a portion of the pump stroke, thereby giving a different ratio to the feed and discharge and at the same time delivering to the heated concentrated discharge a sufficient quantity of cold water to destroy the flash.

Means are also provided for varying the time and duration of the by-pass opening whereby the pump may be adapted to different conditions, as will be hereinafter explained more at length.

In the accompanying drawings we have illustrated a pump of improved design embodying our invention, and have also illustrated the preferred manner of its connection to the evaporator to secure the desired results.

In the drawings,

Fig. 1 is a vertical sectional view of the pump with the attached engine shown in side elevation;

Fig. 2 is an elevational view looking from the right of Fig. 1;

Fig. 3 shows the pump in vertical section through the plane of the discharge valves instead of the suction valves as shown in Fig. 1;

Figs. 4 and 5 are horizontal sectional views on the correspondingly numbered lines of Fig. 1;

Figs. 6, 7 and 8 are diagrammatic views showing the connection of the pump to the evaporator with the pump piston in different positions in its stroke;

Fig. 9 is a detail view on an enlarged scale of the actuating mechanism for the by-pass.

Referring to the drawings, 1 indicates the pump cylinder preferably vertically arranged, and contains a solid piston 2 with an enlarged piston rod 3 working through a stuffing box in the upper wall of the cylinder. The piston rod 3 is attached directly to the piston of the steam engine 5. The engine is not shown in detail, but consists of a simple double-acting engine whose valve 6 is controlled through a valve gear embodying an oscillating member 7 connected to the piston rod 4 of the engine.

A double valve chest 8 is attached to one side of the pump cylinder and contains a pair of valves 9 and 10, respectively, for controlling the pumping action on the feed side of the pump piston, that is the lower end of the cylinder and a pair of corresponding valves 11 and 12, respectively, for the upper end of the cylinder which controls the discharge of the concentrated solution from the evaporator.

In Fig. 2 of the drawing the side of the valve chest for the lower end of the cylinder is at the right and the portion of the chest for the upper part of the cylinder at the left.

The valve chest for the lower part of the cylinder comprises a chamber divided into three vertically superposed compartments 14, 15 and 16, respectively, by a pair of transverse webs having ports controlled by the valves 9 and 10, as shown more particularly in Fig. 1 of the drawings. The middle compartment 15 of the valve chamber is connected to the lower end of the cylinder 1 by a port 17 formed in the side wall of the cylinder so that on the up stroke of the piston the liquid will be drawn from the chamber 14 through the valve 9 into the chamber 15 and thence into the pump cylinder, while on the down stroke the contents of the cylinder will be discharged through the port 17, chamber 15 and valve 10 into the upper chamber 16 and thence through the exit port 18 to which the feed line of the evaporator is connected. The chamber 14 is provided with a similar entrance port 19 which will be connected to the overboard pipe or other source of supply.

The other side of the valve chest (see Fig. 3) is also divided in three compartments of which the middle compartment 20 is connected by a suitable port 21 with the upper end of the pump cylinder, whereby on the down stroke of the piston the liquid will be drawn from the lower chamber 22 through the valve 11 into the pump cylinder and on the up stroke the liquid drawn into the cylinder will be discharged through the valve 12 into the upper compartment 23 to whose exit port 24 the discharge line of the evaporator is connected. The lower chamber 22 is also provided with an open port 25 in its side wall which will be connected by suitable piping with the evaporator shell, through which pipe the concentrated solution is drawn out by the pump.

With the pump as so far described, assuming the enlarged piston rod 3 to have a cross sectional area equal to one half the cross sectional area of the cylinder, the pump on each stroke will discharge the full capacity of its cylinder into the evaporator shell and withdraw from the evaporator shell a quantity of solution equal to one half the capacity of the cylinder with a vapor out-put from the evaporator equal to one-half the capacity of the pump during its prescribed period of operation.

In order to vary the relative quantities of feed and blowdown and also to provide for the discharge of cold water into the blow-down from the evaporator, we have provided a by-pass arrangement comprising essentially an auxiliary valve chamber 26 attached to the outer wall of the valve chamber and divided by two transverse webs into three compartments. Of these the upper compartment 27 is connected by a suitable open port with the compartment 16 of the feed side of the pump, while the lower compartment 28 is similarly connected by an open port with the intermediate compartment 20 on the discharge side of the pump. The middle compartment serves merely as a passage between the upper and lower compartments and communicates with the upper compartment through a positively actuated upwardly opening poppet valve 29 normally held closed by its spring, and with the lower compartment through a spring controlled upwardly opening check valve 30.

The valve 29 may be controlled by any suitable mechanism designed to hold it positively open during a portion of the pump stroke. We have shown for the purpose a simple trip mechanism comprising a rocking lever 31 fulcrumed on the top wall of the valve chamber and provided at its outer end with a fork embracing the stem of the valve 29 to lift the valve against the tension of its spring when the opposite end of the lever is depressed. The opposite end of the lever is provided with a lug 32 on its upper surface with the face of the lug toward the fulcrum of the lever inclined to provide a cam surface designed to be engaged by a corresponding cam surface on an adjustable dog 33 carried by a rotating disk 34.

The disk 34 is mounted for rotation on a stud carried by an arm depending from the fixed bracket on which the oscillating member 7 of the engine valve gear is fulcrumed. The disk is provided with a driving pawl 35 designed to engage a ratchet 36 attached to a pinion 37 also freely rotatable on the stud and meshing with the teeth of a sector 38 forming a third arm of the oscillating lever 7 of the valve gear.

The arrangement is such that the disk 34 is rotated in one direction upon reciprocation of the pump piston and oscillation of the sector 38, the pinion and sector being so proportioned that the disk 34 is given one complete rotation upon each down stroke of the piston and remains stationary upon the up stroke.

The dog 33 is adjustably connected to the disk so as to be set at any point in its circumference, preferably by means of a clamping bolt 39 working in a T-slot 40. The disk is also provided with a second dog 42 attached by means of a bolt working in the T-slot, the dog 42 standing slightly further away from the face of the disk than the dog 33 in order to cooperate with a latch 43 pivoted on the wall of the valve chest 8 adjacent the lug 32 of the lever 31 in position to engage a pin 44 set in the side of the lug so that the latch 43 will hold the valve open after the lug 32 has been depressed by the dog 33 until engaged and released by the dog 42.

The lugs 33 and 42 are positioned in the T-slot with respect to each other and with respect to the point on the circumference of the disk adjacent the lug 32 when the disk is still on the up stroke of the pump, such that the distance between the dogs 33 and 42 in the direction of the rotation of the disk represents the period that the by-pass is open, while the extent of rotation of the disk before the dog 33 engages the lug 32 represents the extent of the pump stroke which takes place before the by-pass is open. In practice it is preferable to set the lug 33 in position to open the by-pass immediately following the commencement of the down stroke of the piston so that the first operation of the pump is to draw cold water into the upper end of the cylinder in order that the water may kill the flash in the concentrated solution drawn into the pump upon the remainder of the stroke after the by-pass is closed.

In Figs. 6, 7 and 8 we have illustrated the pump diagrammatically and shown the preferred arrangement of the connections between the pump and the evaporator. In these views, for clearness of illustration, the two compartments of the valve chest 8 have been arranged on opposite sides of the pump and the by-pass valve chamber 26 has been detached and is shown connected to the pump by pipes representing the port openings between the by-pass chamber and the main valve chest.

The feed pipe 50 between the compartment 16 in the valve chest and the evaporator shell is preferably provided with a pressure-controlled valve 61 which is set slightly above the operating pressure of the evaporator. The intake pipe from the sea leading into compartment 14 is indicated at 62 and there is also a by-pass around the pressure valve for emergency use. There is also a by-pass connection 63 between the chambers 14 and 16 for short-circuiting the pump on itself or allowing it to discharge into the sea should it be necessary to temporarily disconnect the feed line from the evaporator.

The blowdown pipe 65 leads to the lower chamber 22 of the valve chest and the discharge pipe 66 leads from the chamber 23, the pipes 65 and 66 being connected by a valved by-pass to be used for short-circuiting the discharge side of the pump when desired, or for allowing a direct blowdown from the evaporator shell without passing through the pump.

Fig. 6 shows the pump piston on its upward stroke during the whole of which the by-pass is closed and the lower part of the cylinder is acting to draw raw water into the pump cylinder through the pipe 62 and valve 9, while the upper portion of the cylinder is acting to discharge the contents of mingled raw water and concentrated solution through the valve 12 into discharge pipe 66 as indicated by the arrows. Fig. 7 shows the pump after the down stroke has commenced and the by-pass valve 29 has been opened by the trip mechanism. During this portion of the stroke the raw water previously drawn into the lower portion of the cylinder is discharged through the port 17 and valve 10 into the chamber 16, from which one half of the volume is fed through pipe 50 and pressure valve 61 into the evaporator (assuming the relative capacities of the two sides of the pump to be 2 to 1). The other half of the output will be discharged into the upper chamber of the by-pass valve, thence through the valve 29 and check valve 30, into the upper chamber of the pump cylinder. The pump during this portion of the stroke does not draw any concentrated solution from the evaporator for the reason that the pressure from the pump is greater than that from the evaporator shell, due to the fact that the pump has to overcome the pressure on the regulating valve 61 in order to force the feed water into the shell.

Fig. 8 shows the pump piston working through the latter part of its stroke after the by-pass valve has been closed by the dog 42, releasing the trip 43. During this portion of the stroke all the discharge from the lower portion of the pump cylinder passes into the evaporator shell, while the upper portion of the cylinder acts to draw the concentrated solution from the shell through the valve 11, the valve 30 of the by-pass mechanism serving as a check valve to prevent back pressure on the valve 29.

Assuming that the area of the bottom surface of the piston 2 is twice as large as its upper surface around the enlarged rod 3, and that the by-pass remains open for one half the down stroke of the piston, the operation will be as follows. At the commencement of the down stroke of the piston the lower part of the cylinder 1 will be filled with raw water. As the piston moves downward the water discharged from the cylinder will be delivered, one half to the evaporator shell, and one half through the by-pass to the upper side of the piston. This division of the discharge, lasting through one half the stroke of the piston, causes one quarter of the total volumetric capacity of the lower part of the cylinder to be diverted from the feed, that is, for each reciprocation of the pump three quarters the capacity of the pump is delivered to the evaporator shell.

After the by-pass is closed the pump draws the concentrated solution from the shell, so that, during one half of the stroke the discharge equals one half the capacity of the cylinder, or the total discharge for each stroke of the pump equals one quarter the capacity of the pump cylinder. Hence, the ratio of feed to discharge will be three quarters to one quarter, or 3 to 1.

The relative capacities of the two sides of the pump may, of course, be different than that described. It is desirable, however, to have the difference in the fixed capacities of the two sides of the pump not too great, so that a large portion of the intake must be by-passed to give the desired ultimate proportion of feed and discharge. By by-passing a large proportion of the intake a large quantity of cold water is drawn into the discharge side of the cylinder before the hot concentrated solution is drawn from the shell, whereby the temperature of the ultimate discharge may be so reduced as to prevent the formation of "flash" with the resulting back pressure and knocking and interfering with the working of the pump. The by-passing of the cold water also serves to keep the pump cool.

By employing a single pump for the feed discharge with a mechanically actuated by-pass, the desired ratio between the feed and discharge is maintained constant at all times, regardless of variations in the operating pressure of the evaporator and the speed of the pump. Also, varying pressures on the several feed lines will not affect the ratio of the feed and discharge.

A constant level may be maintained in the evaporator shell by connecting the throttle of the engine for the pump to the float feed control of the evaporator in any well known manner for the purpose of regulating the pump speed to deliver varying amounts of liquid to the evaporator shell as the liquid level changes.

Various other additions and modifications may obviously be made without departing from the spirit of the invention or the scope of the appended claims.

We claim:

1. In a combined feed and discharge pump, a pump chamber for the feed, a pump chamber for the discharge, and means controlled by the pump for by-passing a predetermined quantity of the feed into the discharge.

2. In a combined brine discharge and feed pump, the combination of a pump chamber for the feed, a pump chamber for the discharge, a by-pass connection between said chambers, and automatic means for periodically opening said by-pass during the operation of the pump.

3. In a combined brine discharge and feed pump, the combination of a pump chamber for the feed, a pump chamber for the discharge, a by-pass connection between said chambers, and automatic means for periodically opening said by-pass during a portion of each complete operation of said pump.

4. In a combined brine discharge and feed pump, the combination of a pump chamber for the feed, a pump chamber for the discharge, a by-pass connection between said chambers, automatic means for periodically opening said by-pass during a portion of each complete operation of said pump, and means for varying the duration of the period that said by-pass is open.

5. In a combined feed and discharge pump, a pump chamber for the feed, a pump chamber for the discharge, means controlled by the pump for by-passing a predetermined quantity of the feed into the discharge, and adjustable means for varying the ratio of said quantity and the volume of pump feed.

6. In a combined feed and discharge pump, the combination of a pump cylinder, a piston therein dividing the cylinder into two separate pump chambers, valves controlling both said chambers, a connection from the feed line to one of said chambers and from the discharge line to the other of said chambers, a by-pass from one said chamber to the other, and means controlled by the movement of the piston for opening said by-pass during a portion of the piston stroke.

7. In a combined feed and discharge pump, the combination of a pump cylinder, a piston therein dividing the cylinder into two separate pump chambers, valves controlling both said chambers, a connection from the feed lines to one of said chambers and from the discharge line to the other of said chambers, a by-pass valve between said chambers, and means controlled by the movement of the piston for opening and closing said by-pass valve during a portion of the piston stroke, said last-named means being adjustable to vary the duration of the period that the by-pass is open.

8. In a combined feed and discharge pump, pump chambers for said brine and feed, each having a reciprocating piston, a by-pass connecting said chambers, and automatic means for opening said by-pass at the beginning of the suction stroke of the piston in the discharge chamber and for closing said by-pass before the completion of said stroke.

9. In a combined feed and discharge pump, a feed pump chamber, a discharge pump chamber, a by-pass between the two, a valve in said by-pass, and means for periodically opening said by-pass valve comprising an arm for lifting the valve and mechanism operated by the pump and adapted to engage and shift the arm during a portion of the operation of said pump.

10. In a combined feed and discharge pump, the combination of separate pump chambers for the feed and discharge, a reciprocating pump piston, a by-pass between said chambers, a valve in said by-pass and means for operating said valve comprising a rotatable actuating member, connections between said member and said piston to rotate the member a complete revolution upon each stroke of the piston and a dog carried by said member arranged to effect an opening of said valve during a portion of its travel, said dog being adjustable to thereby vary the operation of the valve.

11. In a combined feed and discharge pump, the combination of separate pump chambers for the feed and discharge, a reciprocating pump piston, a by-pass between said chambers, a valve in said by-pass and means for operating said valve comprising a rotatable actuating member, connections between said member and said piston to rotate the member a complete revolution upon each stroke of the piston, a dog carried by said member arranged to effect an opening of said valve during a portion of its travel, and a second dog carried by said member arranged to close said valve, and means for relatively adjusting said dogs to vary the duration of valve opening.

12. In a combined feed and discharge pump, the combination of separate pump chambers for the feed and discharge, a reciprocating pump piston, a by-pass between said chambers, a valve in said by-pass and means for operating said valve comprising a rotatable actuating member, connections between said member and said piston to rotate the member a complete revolution upon each stroke of the piston, a dog carried by said member arranged to effect an opening of said valve during a portion of its travel, and a second dog carried by said member arranged to close said valve and means for adjusting both said dogs to vary the time and duration of valve opening.

In testimony whereof we have affixed our signatures.

ERIC HUGO NELSON.
EDWARD A. DEWALD.